3,172,905
CATALYTIC PREPARATION OF ESTERS FROM
TERTIARY OLEFINS AND CARBOXYLIC
ACIDS
George W. Eckert, Wappingers Falls, N.Y., assignor to
Texaco Inc., New York, N.Y., a corporation of
Delaware
No Drawing. Filed Oct. 20, 1961, Ser. No. 146,437
3 Claims. (Cl. 260—497)

The instant invention relates to a catalytic process for the preparation of carboxylic acid esters of tertiary alcohol and more particularly to such a process where a "tertiary base" or, more simply, a "tertiary olefinic compound" is reacted in an esterification zone with a carboxylic acid employing a sulfo-fatty acid as the catalyst.

Using for example acetic acid, isobutylene and alpha-sulfostearic acid and the reaction can be represented as follows:

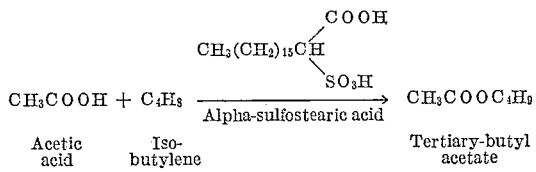

$$CH_3COOH + C_4H_8 \xrightarrow[\text{Alpha-sulfostearic acid}]{CH_3(CH_2)_{15}CH(COOH)(SO_3H)} CH_3COOC_4H_9$$

Acetic acid   Iso-butylene   Tertiary-butyl acetate

The ester products of the invention are useful as a group as solvents for many organic materials and therefore are useful as vehicles therefor. Tertiary(t) esters such as t-butyl acetate are useful as paint solvents, grease components and additives for improving octane ratings of high quality leaded gasoline.

The condensing of a tertiary olefin compound with a carboxylic acid is usually done in the presence of a catalyst. Some of the catalysts employed in the past were sulfuric acid, complexes of boron trifluoride, orthophosphoric acid suitably supported on an inert support such as kieselguhr, benzenesulfonic acid, alkyl sulfates and other strong acids. Such catalysts are normally present as a distinct liquid phase in the esterification reaction mixture or are homogenous therewith or are sorbed on a solid porous carrier, such as silica, charcoal or alumina.

In the condensation of a tertiary olefin compound with a carboxylic acid to form a tertiary ester, there is a serious competing reaction, namely, that of polymerization of the tertiary olefin material. The esterification reaction involving tertiary olefins is far more sensitive to polymer competition than is the corresponding reaction involving a secondary olefin or a primary olefin. Actually, when secondary olefins such as butene-2 are condensed with carboxylic acids, it is conventional to rid the hydrocarbon feed of tertiary olefins by causing them to polymerize, then to operate with the secondary olefin-containing feed. By means of our process hydrocarbon streams can be freed of tertiary olefins without significant polymerization to make a valuable ester product efficiently and the so-treated unreacted hydrocarbons are separated from the ester for other use.

An advantage of our process over conventional processing of tertiary olefinic compounds is that polymerization of these olefins is maintained to a minimum. A further advantage of our process over conventional treatment is it permits the separation of the ester product from the reaction mixture by heat treatment methods such as distillation without undesirable decomposition of the ester product. Distillation or other heat treatments of the crude ester product in the presence of acids such as sulfuric, phosphoric, sulfonic, hydrochloric, benzenesulfonic, trichloroacetic and the like, even in the presence of extremely small amounts of said acids usually results in rapid breakdown of the ester product.

In accordance with the foregoing I have discovered that a sulfo-fatty acid of the formula $HSO_3$—R—COOH where R is a $C_1$ to $C_{21}$ saturated divalent aliphatic hydrocarbon radical is extremely effective in catalyzing the reaction between the tertiary olefinic compound and a carboxylic acid to form the corresponding tertiary ester. In addition I have discovered the sulfo-fatty acid catalyst discourages the undesirable polymerization of the tertiary olefin and does not favor the formation of secondary and primary esters.

In a typical operation of my novel process the tertiary olefin is contacted with a carboxylic acid in a mole ratio between about 5:1 and 1:5, preferably between about 1:1 and 3:1 at a temperature between about 80 and 200° F., preferably between about 100 and 175° F. in the presence of between about 0.01 and 1.0 mole percent sulfo-fatty acid, preferably between about 0.05 and 0.5 mole percent based on the total moles of said olefin and acid. One of the more important process conditions is temperature. It has been found that temperatures of reaction below about 80° F. do not promote substantial yields of tertiary ester.

The novel process is operative whether the reactants and catalyst be in the liquid or in a liquid vapor phase equilibrium. In any case, it is desirable that they be thoroughly mixed prior to or during the reaction period in order to insure high yields of ester product.

The process can be either continuous or batch. If a continuous operation is employed it is desirable to admix the reactants and catalysts with one another prior to exposure to the reaction zone. In such a system the admixture can be fed into the reaction zone at a temperature less than is found in a major portion of said zone and then allowed to reach the reaction temperature autogenously by exothermic heat of reaction. Alternatively, indirect reactor cooling or heating can be used. In a continuous process the reaction mixture is continuously withdrawn from the reaction zone. The components comprising the withdrawn stream can be separated from one another by any standard means such as fractional distillation, filtration and solvent extraction. For exonomic purposes it is desirable to recycle the unreacted reactants and catalyst to the reaction zone.

My novel process may also be a batch or a combination of a batch or continuous process. In the latter the reactants, catalyst and formed products are passed through the reaction zone and continuously recycled therethrough with a batch or incremental withdrawal of the reaction mixture for the separation of the ester product therefrom and the subsequent return of the catalyst and unreacted reactants to the circulating reaction system.

Corrosion resistant apparatus vessels are in order, e.g., ones composed of austenitic stainless steel, high chrome stainless steel and the like because of the possible corrosive tendencies of the reactants and catalyst.

Specific examples of suitable sulfo-fatty acid catalysts contemplated herein are alpha-sulfoacetic acid, alpha-sulfobutyric acid, alpha-sulfocaproic acid, alpha-sulfocaprylic acid, 2-sulfo-4-ethyl hexanoic acid, alpha-sulfolauric acid, alpha-sulfopalmitic acid, alpha-sulfostearic acid, alpha-sulfobehenic acid.

In respect to the term "tertiary olefinic hydrocarbon" I intend a hydrocarbon containing at least one tertiary olefinic carbon. The useful olefinic starting materials for my process have at least one side chain branching from an olefinic carbon atom (including an olefinic carbon atom in a cyclic structure). Specific examples of suitable olefinic hydrocarbons for use in my process include isobutylene, 2-methyl-1-butene, 2-methyl-2-butene, 3-ethyl-3-heptene, 2,3-dimethyl-3-decene and 1-methyl-1-cyclohexene. Because of cost and availability, the aliphatic $C_{4-12}$ tertiary monoolefinic aliphatic hydrocarbons are the most desirable for my process.

The olefins can be pure, mixed with each other or mixed with unreactive or substantially less reactive materials. Thus, for example, I can use pure isobutylene made by cracking an isobutylene dimer. On the other hand, I can use $C_4$ and/or a $C_5$ cut from a catalytic or thermal cracking operation which would ordinarily contain somewhat less of the tertiary olefin and the balance of other diluent hydrocarbons. A typical so-called "B-B" stream from catalytic cracking can contain 10–25 mole percent isobutylene, 50 mole percent paraffins and the balance preponderantly butene-1 and cis- and trans-butene-2. A suitable stream for making t-butyl carboxylic acid esters is a stream containing about 25 mole percent butylenes and the balance predominantly normal butane.

Other olefins which may be employed in my process are the polyolefins, such as 2,4-dimethyl-2,4-hexadiene and isoprene. Also suitable are oxygenated aliphatic hydrocarbon compounds of tertiary base olefinic configuration, e.g. alkyl vinyl ethers such as ethyl or methyl vinyl ether.

The particular carboxylic acid reactant employed is dictated by the particular product desired. Because the presence of water in the esterification reactor induces a competing reaction, namely, one wherein tertiary alcohols are made, the reaction is preferably anhydrous for best yields. Thus, for example, when acetates are made exclusively, glacial acetic acid is desirably employed.

The carboxylic acid reactants can be fatty acids, suitably in the range of from formic to stearic acid and advantageously $C_1$-$C_8$ fatty acid. Alternatively, there can be polybasic acids, e.g., malonic, oxalic and so on, suitably up to sebacic or even higher. They can have inert nuclear substitutes for hydrogen atoms (such as keto, nitro, halogen, alkoxy tertiary phosphate, etc.). They can have an aromatic nucleus such as benzoic, phthalic, toluic or the like.

Typical of the carboxylic acid reactants which can be employed in the condensation with the olefins contemplated herein include formic, acetic, propionic, butyric, isobutyric, valeric, isovaleric, caprylic, 2-ethylhexanoic, oxalic, malonic, acetone dicarboxylic, benzoic, monochloroacetic and cyclohexane carboxylic.

The reaction can be conducted in the presence of an inert vehicle, e.g. ether, benzene, toluene or the like. Such a tchnique can be useful for dissolving one or both of the reactants and catalysts.

The subsequent examples illustrate my invention but should not be construed as limiting the invention.

EXAMPLE I

This example illustrates the process of the invention.

In all runs reported in subsequent Tables A and B the following procedure was employed. To a 2 liter draft tube reactor there was added acetic acid, alpha-sulfostearic or alpha-sulfopalmitic acids and the reactor was pressured with isobutylene. The resultant reaction mixture was heated to the desired temperature for a period of 3 hours during which time it was constantly stirred. At the end of the 3 hour reaction period, the liquid reactor was vented leaving a liquid solution. The liquid reaction mixture was successively washed with 2 liters of water, 2 liters of 5–10% aqueous sodium carbonate and then 2 liters of water. The washed reaction product was then subjected to vapor phase (V.P.) chromatographic analysis.

In Table A, below, are found the reaction data and results exemplifying the process of the invention:

Table A

| Description | A | B | C | D |
|---|---|---|---|---|
| Charge—Grams: | | | | |
| Acetic Acid | 300 | 300 | 300 | 300 |
| Isobutylene | 600 | 600 | 600 | 600 |
| Alpha-Sulfostearic Acid | 9.0 | 9.0 | | |
| Alpha-Sulfopalmitic Acid | | | 9.0 | 9.0 |
| Run Conditions: | | | | |
| Temperature, °F | 125 | 150 | 160 | 170 |
| Time, Hrs | 3 | 3 | 3 | 3 |
| Product Wt., Grams (After washing with water and Na₂CO₃ solution) | 188 | 325 | 292 | 296 |
| Analysis Product, Mole Percent: | | | | |
| t-Butyl Acetate | 95.7 | 88.2 | 87.1 | 90.1 |
| C₄-Isobutylene | 3.6 | 10.4 | 11.8 | 8.6 |
| Diisobutylene | 0.6 | 1.1 | 0.7 | 1.0 |
| Theoretical Yield of t-Butyl Acetate, Mole percent of Theory Based on Acetic Acid | 31.0 | 49.4 | 43.9 | 46.1 |

As can be seen from the above, the maximum polymerization, that is, the formation of diisobutylene was kept to less than 1.1% of the reaction product. Further the yield of tertiary butyl acetate product, based on theoretical, ranged from between about 30 to 50%.

In Table B, below, data and results are represented concerning runs which were essentially duplicates of those represented in Table A except they were conducted at reduced temperature:

Table B

| Description | E | F |
|---|---|---|
| Charge—Grams: | | |
| Acetic Acid | 300 | 300 |
| Isobutylene | 600 | 600 |
| Alpha-Sulfostearic Acid | 9.0 | 18.0 |
| Run Conditions: | | |
| Temperature, °F | 40–50 | 67 |
| Time, Hrs | 3 | 3 |
| Product Wt., Grams (After washing with water and Na₂CO₃ solution) | 25 | 29 |
| Analysis Product, Mole Percent: | | |
| t-Butyl Acetate | 98.1 | 91.4 |
| C₄-Isobutylene | 1.2 | 7.9 |
| Diisobutylene | 0.6 | 0.5 |
| Theoretical Yield of t-Butyl Acetate, Mole Percent of Theory Based on Acetic Acid | 4.2 | 4.6 |

It can be seen by comparing the yield of tertiary butyl acetate in Table A with that of Table B that it is advantageous to maintain the reaction temperature above about 80° F.

EXAMPLE II

The example illustrates the effectiveness of the sulfofatty acid catalysts of the invention.

To a one gallon stainless steel batch reactor fitted with an agitator, thermometer, pressure gauge, heat exchange coils and valved entrances and exits there was added 360 grams of acetic acid and 168 grams of isobutylene. The stirred reaction mixture was heated to 200° F. for a period of 6 hours whereupon it was cooled to room temperature and analyzed by mass spectrometry. The yield of tertiary butyl acetate was found to be 1.5 mole percent based on acetic acid. In comparison the process of the invention as exemplified in Example I, Table A utilizing sulfo-fatty acid catalyst gave t-ester yields of from 31 to over 49 mole percent.

I claim:

1. A process for producing a tertiary ester consisting of contacting an aliphatic tertiary mono-olefinic hydrocarbon of 4 to 12 carbons with a saturated aliphatic hydrocarbon fatty acid of 1 to 18 carbons in the presence of a catalyst selected from the group consisting of alpha-sulfostearic and alpha-sulfopalmitic acid, said contacting conducted at a temperature of between about 80 and 200° F., said mono-olefinic hydrocarbon and said fatty acid being present in a mole ratio of between 5:1 and 1:5 and said catalyst being present in a mole percent of between about 0.1 and 1 based on the total moles of reactants.

2. A method in accordance with claim 1 wherein said hydrocarbon is isobutylene, said acid is acetic acid and said catalyst is alpha-sulfopalmitic acid.

3. A method in accordance with claim 1 wherein said hydrocarbon is isobutylene, said acid is acetic acid and said catalyst is alpha-sulfostearic acid.

References Cited in the file of this patent

UNITED STATES PATENTS

| | | |
|---|---|---|
| 2,006,734 | Edlund et al. | July 2, 1935 |
| 2,041,193 | McCandliss | May 19, 1936 |
| 3,014,066 | Kerr et al. | Dec. 19, 1961 |